US005624000A

United States Patent [19]

Miller

[11] Patent Number: 5,624,000

[45] Date of Patent: Apr. 29, 1997

[54] POWER TOOL WITH MODULAR DRIVE SYSTEM AND METHOD OF ASSEMBLY OF MODULAR DRIVE SYSTEM

[75] Inventor: Philip T. Miller, Lutherville, Md.

[73] Assignee: Black & Decker, Inc., Newark, Del.

[21] Appl. No.: 630,470

[22] Filed: Apr. 10, 1996

Related U.S. Application Data

[63] Continuation of Ser. No. 280,743, Jul. 26, 1994, abandoned.

[51] Int. Cl.[6] .......... B23B 45/02

[52] U.S. Cl. .......... 173/216; 173/47; 173/104; 173/217

[58] Field of Search .......... 173/47, 48, 104, 173/216, 217; 408/124; 403/361, 372, 375, 345, 13

[56] References Cited

U.S. PATENT DOCUMENTS

| | | | |
|---|---|---|---|
| 2,350,631 | 6/1944 | Mitchell | 310/83 |
| 2,708,246 | 5/1955 | Dunn | 403/359 X |
| 2,730,635 | 1/1956 | McCabe | 310/83 |
| 3,774,477 | 11/1973 | Murphy | 475/331 |
| 3,908,139 | 9/1975 | Duncan, Jr. | 173/217 X |
| 4,081,704 | 3/1978 | Vassos et al. | 173/217 |
| 4,089,612 | 5/1978 | Mazzeo | 403/361 |
| 4,092,946 | 6/1978 | Kappas | 475/149 |
| 4,099,478 | 7/1978 | Alexander | 475/149 |
| 4,575,277 | 3/1986 | Dickey et al. | 403/361 |
| 4,597,453 | 7/1986 | Kilmer et al. | 81/57.31 |
| 4,625,134 | 11/1986 | Weaver | 310/83 |
| 4,828,049 | 5/1989 | Preis | 173/217 |
| 4,898,249 | 2/1990 | Ohmori | 173/217 X |
| 5,015,117 | 5/1991 | Pawlicki | 403/300 |
| 5,033,552 | 7/1991 | Hu | 173/217 |
| 5,054,563 | 10/1991 | Zapf | 173/217 |
| 5,269,733 | 12/1993 | Anthony, III | 81/87.31 |

FOREIGN PATENT DOCUMENTS

| | | |
|---|---|---|
| 189768 | 8/1986 | European Pat. Off. . |
| 302244 | 2/1989 | European Pat. Off. . |
| 525911 | 2/1993 | European Pat. Off. . |
| 570889 | 11/1993 | European Pat. Off. . |
| 2542655 | 9/1984 | France . |
| 2511806 | 10/1975 | Germany . |
| 8910433 | 2/1990 | Germany . |
| 1143677 | 2/1969 | United Kingdom . |
| 2030374 | 4/1980 | United Kingdom . |
| 2246311 | 1/1992 | United Kingdom . |

*Primary Examiner*—Joseph J. Hail, III
*Assistant Examiner*—Jay A. Stelacone
*Attorney, Agent, or Firm*—Charles P. Boukus, Jr.; Dennis A. Dearing

[57] ABSTRACT

A power tool (20) includes a modular drive system in which the motor (22) and transmission (24) consist of separate self-contained modular units which can be assembled together by simply sliding and rotating the motor housing (42) and the transmission housing (70) relative to each other. The motor (22) has a D-shaped rotary drive shaft (44) which is inserted into a D-shaped aperture (86) in the drive gear (84) of a planetary gear system (80) contained within the transmission housing (70). Guide pins (92) extending from the transmission housing (70) are inserted into guide holes (94) in the motor housing (42) when the D-shaped drive shaft (44) is inserted into the D-shaped aperture (86) in the drive gear (84) to align the housings (42,70) with each other. A bushing (46) at the front of the motor housing (42) is inserted into a central opening (76) at the rear of the transmission housing (70) to couple the housings (42,70) together.

22 Claims, 3 Drawing Sheets

POWER TOOL WITH MODULAR DRIVE SYSTEM AND METHOD OF ASSEMBLY OF MODULAR DRIVE SYSTEM

This application is a continuation of application Ser. No. 08/280,743, filed Jul. 26, 1994, now abandoned.

FIELD OF THE INVENTION

The present invention relates to a power tool including a modular drive system and to a method of assembling a modular drive system for use in a power tool or the like. The modular drive system can be used in power tools, such as power drills and screw drivers, and in kitchen appliances, such as mixers and blenders.

BACKGROUND OF THE INVENTION AND PRIOR ART

In conventional power tools, e.g., hand-held power drills and screw drivers, it is known to use an electric drive motor which is coupled with a planetary gear reduction system to transmit the rotation of the motor drive shaft to a rotary chuck. Typically, the electric motor is a self-contained unit and the drive shaft of the motor is provided with a pinion gear which forms part of the planetary gear reduction system. To assemble the drive motor and the planetary gear system, a mounting plate is bolted onto the end wall of the motor housing with the motor drive shaft and the pinion gear extending through a central opening in the mounting plate. The other components of the planetary gear reduction system, i.e., the carrier plate and the planetary gears are assembled in a gear housing which supports a rotary output shaft for connection to the rotary chuck. The motor housing with the attached mounting plate is aligned with the gear housing and the pinion gear on the motor drive shaft is inserted between the planetary gears within the gear housing. The mounting plate is secured by a set of screws to the gear housing to complete the assembly of the drive system. It is also known to use bayonet-type fasteners to secure the gear housing to the mounting plate.

SUMMARY OF THE INVENTION

A primary object of the invention is to provide a power tool including a modular motor and transmission system with a simplified construction which is easily and accurately assembled.

The present invention is particularly concerned with a power tool including a modular drive system in which the motor and transmission consist of separate self-contained modular units which can be assembled together by simply sliding and rotating the motor and transmission housings relative to each other.

In accordance with one aspect of the invention, as embodied and described herein, a power tool including a modular drive assembly comprises a modular drive motor including a motor housing and a rotary drive shaft, and a modular transmission including a transmission housing which contains a planetary gear system having a drive gear including an aperture for insertion of the drive shaft. One or more guide members extend from one of the housings for insertion into one or more guide holes in the other of the housings when the drive shaft is inserted in the aperture of the drive gear to align the housings with each other.

To facilitate the assembly of the modular drive system, the drive shaft is key-shaped in cross section and the aperture in the drive gear has a keyhole-shaped cross section for slidably receiving the drive shaft when the motor housing and the transmission are assembled. The guide members comprise one or more guide pins formed on an end wall of the transmission housing and the guide holes are formed on an end wall of the motor housing for slidably receiving the guide pins. To retain the motor housing and the transmission housing together, one or more press fit ribs are formed on each of the guide pins for frictionally engaging the inside of the guide holes.

To further stabilize the coupling of the motor and the transmission, the motor housing includes an annular bushing extending from the end wall of the motor housing and surrounding the drive shaft and the transmission housing has an opening formed in its end wall for slidably receiving the annular bushing when the motor housing and the transmission housing are assembled together. One or more press fit ribs are formed on the inside of the opening for frictionally engaging the annular bushing to retain the motor housing and the transmission housing together.

To facilitate the assembly of the modular motor and the modular transmission, the motor drive shaft is adapted to slidably engage the aperture in the drive gear before the guide pins are received in the guide holes. Also, the guide pins are adapted to slidably engage the guide holes before the annular bushing is received in the opening in the end wall of the transmission housing. This arrangement allows the modular motor and the modular transmission to be assembled by sliding the motor drive shaft partially into the aperture in the drive gear, rotating the motor and transmission housings relative to each other to align the guide pins with the guide holes, and sliding the motor drive shaft completely into the aperture in the drive gear to slide the guide pins into the guide holes.

In accordance with another aspect of the invention, a method of assembly of a modular drive system for a power tool or the like, wherein the drive system includes a modular drive motor having a motor housing and a key-shaped drive shaft and a modular transmission having a transmission housing which contains a gear system including a drive gear having a keyhole-shaped aperture, comprises the steps of: aligning the motor and the transmission housings with each other to align the key-shaped drive shaft with the keyhole-shaped aperture and partially inserting the key-shaped drive shaft into the keyhole-shaped aperture; and relatively rotating the motor and transmission housings to align one or more guide pins on one of the housings with corresponding guide holes on the other housing and completely inserting the key-shaped drive shaft into the keyhole-shaped aperture to insert the guide pins into the guide holes.

To further stabilize the coupling of the modular drive motor and the modular transmission, the method includes the step of inserting a bushing on the motor housing into a corresponding opening in the transmission housing as the guide pins are completely inserted into the guide holes.

The method of assembly is facilitated by sliding the drive shaft into the aperture in the drive gear before the guide pins are received in the guide holes and sliding the guide pins into the guide holes before the bushing is received in the opening in the transmission housing.

Additional objects and advantages of the invention will be apparent from the detailed description of the preferred embodiment, the appended claims and the accompanying drawings or may be learned by practice of the invention.

BRIEF DESCRIPTION OF THE DRAWINGS

The accompanying drawings which are incorporated in, and constitute a part of, this specification illustrate a preferred embodiment of the invention and together with the description serve to explain the principles of the invention. In the drawings the same reference numerals indicate the same parts.

DETAILED DESCRIPTION OF PREFERRED EMBODIMENTS

Figures 6, 7, 8, 9:
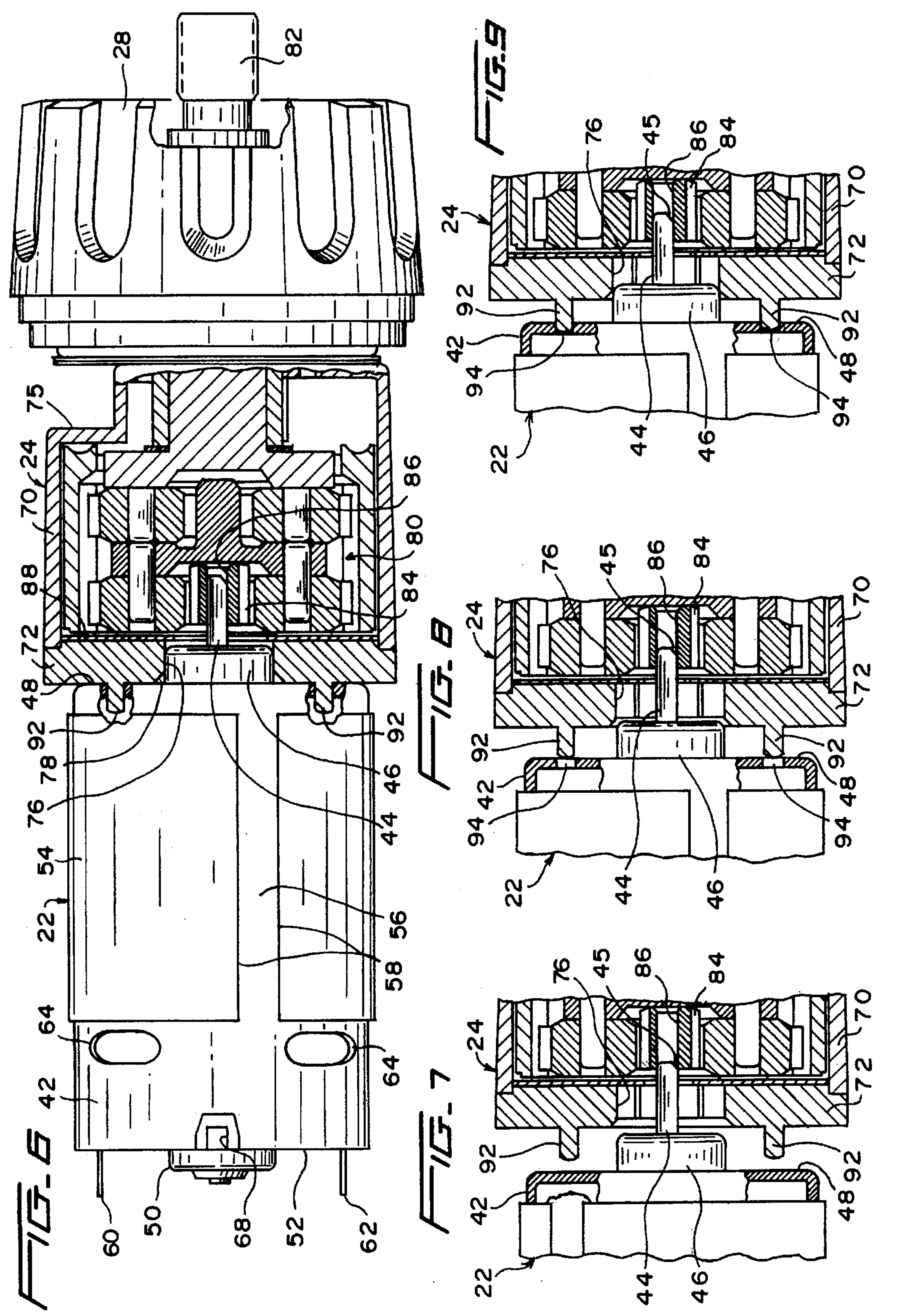
FIG. 6 is an enlarged, partially cutaway side view of the assembled motor and transmission of the modular drive assembly.
FIGS. 7–9 illustrate the steps of assembling the motor and transmission of the modular drive assembly.
Figure 12:
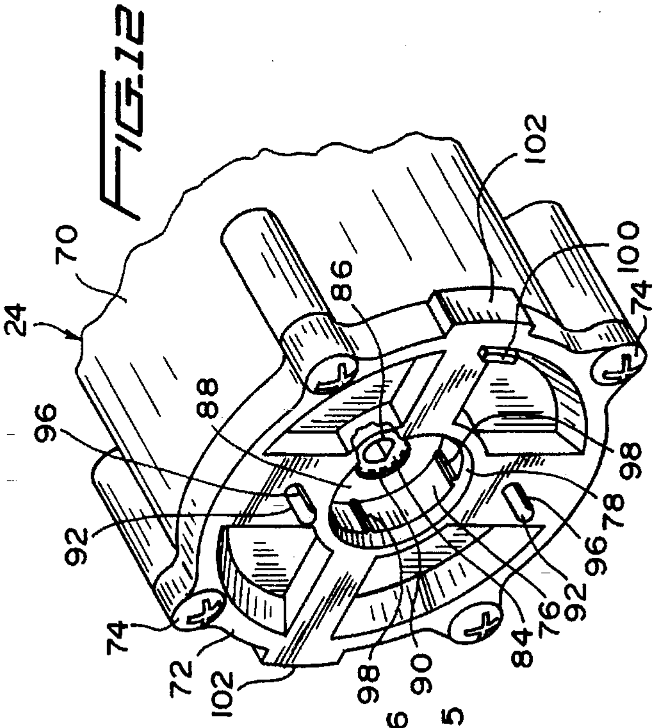
FIG. 12 is an enlarged perspective view of a rear wall of the transmission.
Figure 11:
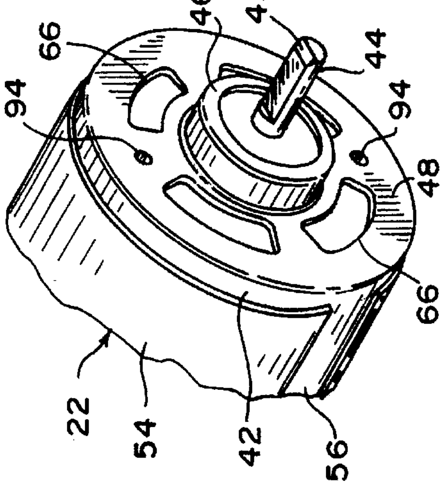
FIG. 11 is an enlarged perspective view of a front wall of the motor.
Figure 10:
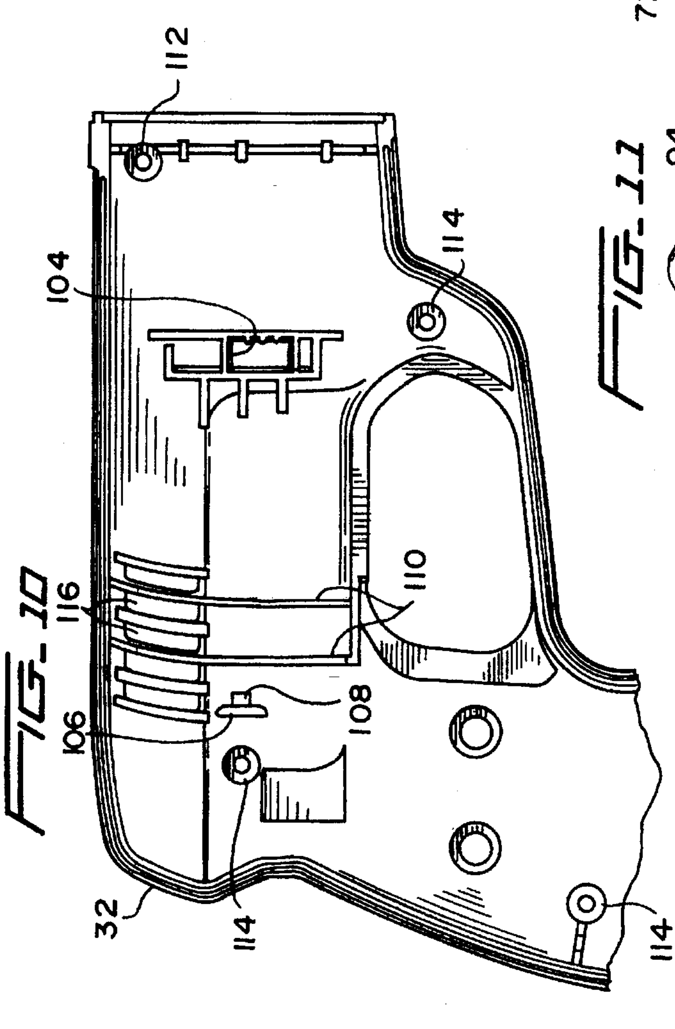
FIG. 10 is a partially cutaway side view showing the interior of the power tool handle with motor and transmission removed.

The preferred embodiment of the power tool including a modular drive system is illustrated in FIGS. 1–5. Details of the embodiment are shown in FIGS. 6 and 10–12. The method of assembly of the modular drive system is shown in FIGS. 7–9.

Figures 1, 2, 3, 4, 5:
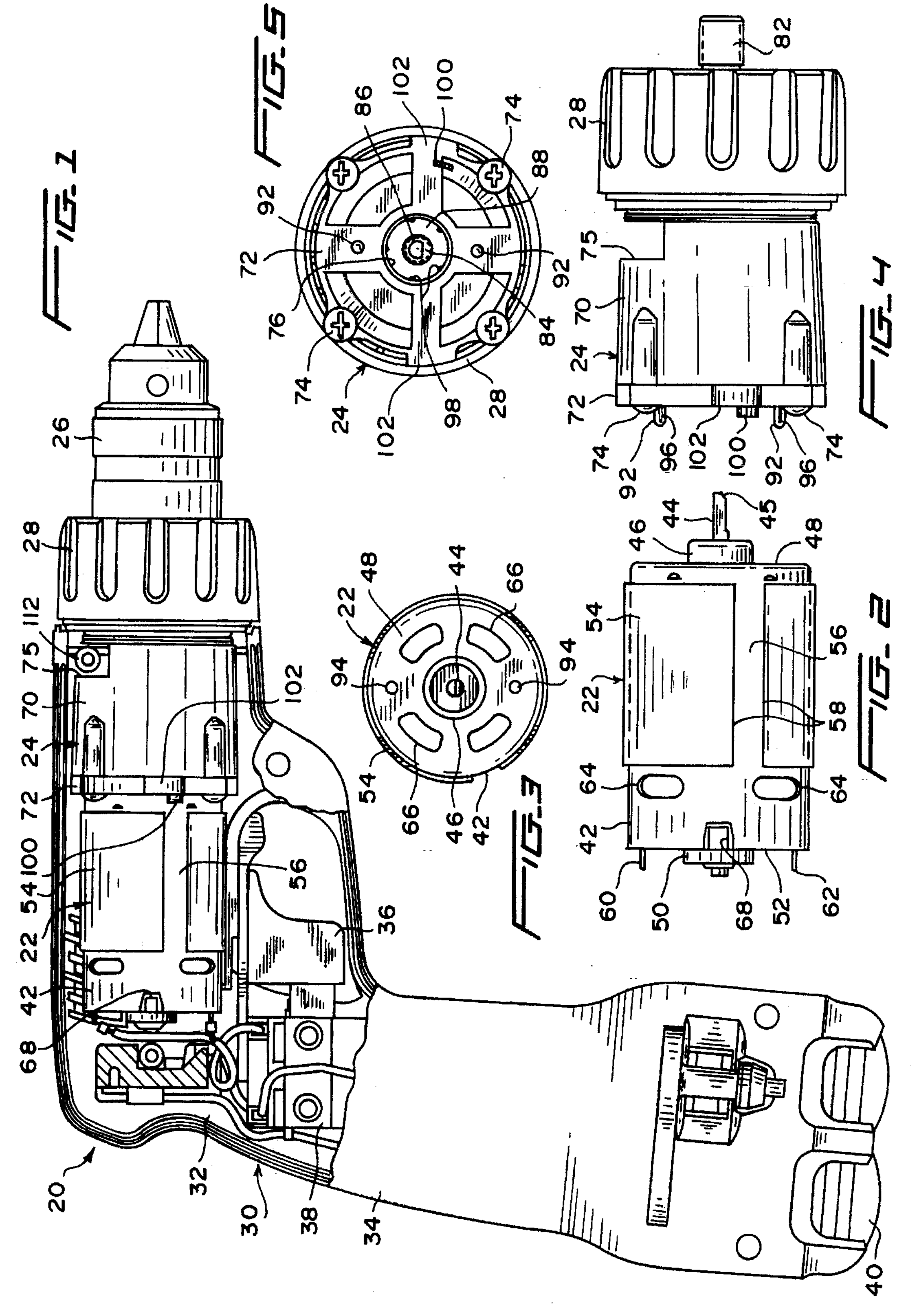
FIG. 1 is a partially cutaway side view of a power tool incorporating a modular drive system in accordance with the present invention.
FIG. 2 is a side view of a motor employed in the modular drive system.
FIG. 3 is a front view of the motor shown in FIG. 2.
FIG. 4 is a side view of a transmission employed in the modular drive system.
FIG. 5 is a rear view of the transmission shown in FIG. 4.

Referring to FIG. 1, the invention is embodied in a power tool, generally 20, e.g., a battery-powered hand-held power drill, including a modular electric drive motor 22 and a modular transmission 24 which together comprise a modular drive system for driving a rotary chuck 26. A rotatable adjustment collar 28 is mounted on the transmission 24 for adjusting the torque which is transmitted to the rotary chuck 26.

The power tool 20 has a two-part handle assembly 30 which is split longitudinally and includes a pair of mating handle sections 32 and 34 adapted to fit together to contain the motor 22 and transmission 24. The handle sections 32 and 34 are preferably made of plastic material. The power tool 20 has a manually operated trigger 36 for actuating a switch 38 to control the flow of electric current from a rechargeable battery pack 40 to the motor 22.

As shown in FIGS. 2 and 3, the modular electric motor 22 includes an elongated generally cylindrical motor housing 42, which is made of metal, e.g., steel. A rotary drive shaft 44 extends axially along the motor housing 42 and projects outward from the front of the motor 22. The rotary drive shaft 44 is rotatably supported on bearings (not shown) in an annular bushing or boss 46 extending forwardly from a front wall 48 of the motor housing 42 and in an annular bushing or boss 50 extending rearwardly from a rear wall 52 of the motor housing 42. The motor 22 has an annular flux ring 54 made of magnetic material, e.g. steel, and surrounding the cylindrical motor housing 42 except for a longitudinal gap 56 which extends between the opposite ends 58 of the flux ring 54. An upper terminal 60 and a lower terminal 62 extend through the rear wall 52 of the motor housing 42 for connection to the negative and positive leads, respectively, from the switch 38. The motor 22 has side vent holes 64 formed in the cylindrical motor housing 42 which also includes a set of vent holes 66 in the front wall 48 and a set of vent holes (not shown) the rear wall 52. A pair of recesses 68 (one shown) is provided on opposite sides at the rear of the motor housing 42 for engagement with the interior of the handle sections 32 and 34, as explained below.

As shown in FIG. 4, the modular transmission 24 includes a generally cylindrical, hollow housing 70 and a rear wall or cover 72 which is attached by a set of screws 74 to the housing 70. Preferably, the transmission housing 70 and the rear wall or cover 72 are made of plastic material. A notch 75 extends transversely across a top front portion of the transmission housing 70. The cover 72 has a central circular opening 76 (FIG. 5) extending axially therethrough for receiving the front bushing 46 on the motor housing 42. The cover 72 has an annular beveled guide surface 78 (FIG. 6) at the rear edge of the circular opening 76 to guide the front bushing 46 into the opening 76.

As shown in FIG. 6, the modular transmission 24 includes a planetary gear system, generally 80, contained within the transmission housing 70 for driving a rotary output shaft 82. For example, the planetary gear system 80 comprises a two-stage planetary gear arrangement of the type disclosed in copending U.S. patent application Ser. No. 08/206,570 filed Mar. 4, 1994, which is herein incorporated by reference.

The planetary gear system 80 has a drive gear 84 including a central aperture 86 for insertion of the drive shaft 44 of the motor 22. The drive shaft 44 is slidably received in the aperture 86 in the drive gear 84 when the motor housing 42 and the transmission housing 70 are assembled together. The drive shaft 44 is key-shaped in cross section and the aperture 86 in the drive gear 84 has a keyhole-shaped configuration to provide a coupling for transmitting the rotation of the motor drive shaft 44 to the drive gear 84 of the planetary gear system 80. In the preferred embodiment, the motor drive shaft 44 has a D-shaped configuration and the aperture 86 in the drive gear 84 has a D-shaped cross section for insertion of the D-shaped drive shaft 44. A chamfered surface 45 at the tip of the D-shaped drive shaft 44 facilitates the insertion of the D-shaped drive shaft 44 into the D-shaped aperture in the drive gear 84.

Referring to FIG. 6, a circular retainer plate 88 is located inside the transmission housing 70 adjacent to the rear wall or cover 72 for retaining the drive gear 84 within the transmission housing 70. The retainer plate 88 has a central opening 90 (FIG. 12) through which the motor drive shaft 44 is inserted into the aperture 86 in the drive gear 84.

In accordance with the invention, one or more guide members or pins 92 extend from one of the housings, i.e., either the motor housing 42 or the transmission housing 70, for insertion into one or more guide holes 94 in the other housing when the drive shaft 44 is inserted into the aperture 86 in the drive gear 84 to align the housings 42 and 70 with each other. In the preferred embodiment, one or more guide members or pins 92 extend rearwardly from the end wall or cover 72 of the transmission housing 70 and one or more guide holes 94 are formed in the front wall 48 of the motor housing 42. For example, a pair of guide pins 92 (FIG. 12) is formed at diametrically opposed positions on the rear wall or cover 72 of the transmission housing 70. A pair of corresponding guide holes 94 (FIG. 11) is formed on the front wall 48 of the motor housing 42 for slidably receiving the guide pins 92 in the assembly of the modular drive system. Alternatively, the guide pins 92 can be located on the motor housing 42 and the guide holes 94 can be located on the transmission housing 72.

In the preferred embodiment, the guide pins 92 are adapted to be press fit into the guide holes 94 to attach the transmission housing 70 to the motor housing 42. For example, one or more longitudinal press fit ribs 96 are formed on each of the guide pins 92 for frictionally engaging the inside of the guide holes 94 to retain the motor housing 42 and the transmission housing 70 together. Also, a press fit is provided between the annular bushing 46 at the front end wall of the motor housing 42 and the circular opening 76 in the rear wall or cover 72 of the transmission housing 70. For example, one or more longitudinal press fit ribs 98 (FIG. 12) are formed on the inside of the opening 76 for frictionally engaging the annular bushing 46 to retain the motor housing 42 and the transmission housing 70 together.

As shown in FIG. 1, an alignment tab 100 which extends rearwardly from the cover 72 of the transmission housing 70 is aligned with the gap 56 in the flux ring 54 to orient the negative terminal 60 in an upper position and to orient the positive terminal 62 in a lower position when the modular drive system is inserted into the power tool handle 30. The alignment tab 100 on the transmission cover 72 and the gap 56 in the flux ring 54 provide a visual alignment feature which facilitates the assembly of the motor 22 and the transmission 24 in the proper orientation before the modular drive system is installed in the power tool handle 30.

A pair of shoulders 102 (FIG. 12) extending radially outward from opposite sides of the cover 72 is received in a corresponding pair of recesses 104 (one shown in FIG. 10) formed on the interior of the power tool handle sections 32 and 34 to non-rotatably attach the transmission housing 70 to the power tool handle 30. A pair of internal, vertical flanges 106 (one shown in FIG. 10) is provided on the power tool handle sections 32 and 34 for engaging the rear wall 52 of the motor housing 42 to retain the motor 22 in a desired axial position within the power tool handle 30. A pair of tabs 108 (one shown in FIG. 10) located at the front of the vertical flanges 106 is engaged in the recesses 68 at the rear of the motor housing 42 to non-rotatably attach the motor housing 42 to the handle sections 32 and 34. Each of the handle sections 32 and 34 has a pair of vertical support ribs 110 which are concave in shape to receive and support the cylindrical motor housing 42.

A cylindrical connecting boss 112 (one shown in FIG. 1) on each of the handle sections 32 and 34 extends transversly through the space provided by the notch 75 at the front of the transmission housing 70. Additional cylindrical connecting bosses 114 (FIG. 10) are provided on each of the handle sections 32 and 34. The connecting bosses 112 and 114 receive a set of screws (not shown) to secure the handle sections 32 and 34 together. Also, a series of vent holes 116 is formed in each of the handle sections 32 and 34.

Another aspect of the invention is a method of assembly of a modular drive system for a power tool or similar device. The steps of the method are illustrated in FIGS. 6–9.

Briefly, the method comprises aligning the key-shaped drive shaft 44 of the motor 22 with the keyhole-shaped aperture 86 in the drive gear 84 of the transmission 24 and partially inserting the drive shaft 44 into the aperture 86 of the drive gear 44. The assembly is completed by relatively rotating the motor housing 42 and the transmission housing 70 to align the guide pins 92 with the guide holes 94 and completely inserting the drive shaft 44 into the aperture 86 to insert the guide pins 92 into the guide holes 94. A more detailed explanation of the assembly method appears below.

Initially, referring to FIG. 7, the motor housing 42 and the transmission housing 70 are aligned with the D-shaped drive shaft 44 extending into the central opening 76 in the cover 72 adjacent to the drive gear 84. The motor housing 42 and the transmission housing 70 are rotated relative to each other to align the D-shaped drive shaft 44 for insertion into the D-shaped aperture 86 in the drive gear 84, and the D-shaped drive shaft 44 is partially inserted into the D-shaped aperture 86.

As shown in FIG. 7, the D-shaped drive shaft 44 is slidably engaged in the D-shaped aperture 86 in the drive gear 84 before the guide pins 92 are received in the guide holes 94. By sliding the motor housing 42 and the transmission housing 70 axially toward each other, the D-shaped drive shaft 44 can be partially advanced into the D-shaped aperture 86 until the guide pins 90 on the cover 72 engage the front wall 48 of the motor housing 42.

As shown in FIG. 8, with the D-shaped drive shaft 44 partially inserted into the D-shaped aperture 86 in the drive gear 84, the motor housing 42 and the transmission 70 are rotated relative to each other to align the guide pins 92 on the cover 72 with the corresponding guide holes 94 in the front wall 48 of the motor housing 42. Then, by sliding the motor housing 42 and the transmission housing 70 axially toward each other, the guide pins 92 are slidably engaged in the guide holes 94 before the front bushing 46 is received in the circular opening 76 in the cover 72 of the transmission housing 70.

Next, as shown in FIG. 9, after the guide pins 92 are slidably engaged in the guide holes 94, the annular bushing 46 at the front of the motor housing 42 enters the circular opening 76 in the cover 72. As the motor housing 42 and the transmission housing 70 slide toward each other, the annular bushing 46 is guided into the circular opening 76 by the beveled guide surface 78 formed on the cover 72 at the periphery of the opening 76.

Finally, as shown in FIG. 6, when the front wall 48 of the motor housing 42 engages the cover 72 of the transmission housing 70, the D-shaped drive shaft 44 is completely inserted into the D-shaped aperture 86 in the drive gear 84 to completely insert the guide pins 92 into the guide holes 94. Also, the annular bushing 46 at the front of the motor housing 42 is completely inserted into the circular opening 76 in the cover 72 of the transmission housing 70 as the guide pins 92 are completely inserted into the guide holes 94.

In the assembled modular drive system, the motor 22 is axially slidably connected to the transmission 24 by the slidable engagement of the D-shaped motor output shaft 44 in the D-shaped aperture 86 in the drive gear 84 of the planetary gear system 80, by the engagement of the guide pins 92 on the cover 72 of the transmission housing 70 with the guide holes 94 on the front wall 48 of the motor housing 42, and by the engagement of the front bushing 46 on the motor housing 42 in the circular opening 78 in the transmission cover 72. The press fit ribs 96 on the guide pins 92 are frictionally engaged inside the guide holes 94 to secure the motor housing 42 and the transmission housing 70 together. In addition, the press fit ribs 98 inside the circular opening 76 frictionally engage the annular bushing 46 to further retain the motor housing 42 and the transmission housing 70 together.

It will be appreciated from the foregoing that a power tool or similar device including a modular drive system in accordance with the invention provides a low cost tool with fewer parts. The power tool 20 is easy to assemble because the motor 22 and the transmission 24 are modular units. The assembly of the motor 24 and transmission 24 is accomplished without the need for separate screws or other fasteners. No complicated assembly procedures are needed to assemble the modular drive system. Instead, the modular motor 22 and the modular 24 transmission are easily assembled by simple sliding and rotational movements relative to each other.

The invention in its broader aspects is not limited to the specific details of the preferred embodiment shown and described, and those skilled in the art will recognize that the invention can be practiced with modification within the spirit and scope of the appended claims.

I claim:

1. A power tool including a modular drive system, comprising:

a tool housing for receiving the modular drive system;

a modular drive motor contained within said tool housing and including a motor housing and a rotary drive shaft;

a modular transmission contained within said tool housing and including a transmission housing which contains a planetary gear system having a set of planetary gears and a drive gear including an aperture for slidable insertion of said drive shaft;

one or more guide members formed on and extending from one of said motor and transmission housings for slidable insertion into one or more guide holes in the other of said motor and transmission housings when said drive shaft is inserted in said aperture in said drive gear to align said motor and transmission housings with each other, each guide member being frictionally engaged in the corresponding guide hole to retain said motor and transmission together to provide the modular drive system for installation in said tool housing; and retainer means formed on said tool housing for engaging said motor and transmission housings to retain said motor and said transmission assembled together inside said tool housing.

2. The power tool of claim 1, wherein:

each guide member comprises a guide pin formed on an end wall of said transmission housing; and each guide hole is formed on an end wall of said motor housing for slidably receiving the corresponding guide pin.

3. The power tool of claim 2, wherein:

one or more press fit ribs are formed on each guide pin for frictionally engaging the corresponding guide hole to retain said motor housing and said transmission housing together.

4. The power tool of claim 1, wherein:

said drive shaft is key-shaped in cross section and said aperture in said drive gear has a keyhole-shaped cross section for slidably receiving said drive shaft when said motor housing and said transmission housing are assembled together.

5. The power tool of claim 1, wherein:

said drive shaft has a D-shaped configuration and said aperture in said drive gear has a D-shaped cross section for slidably receiving said drive shaft when said motor housing and said transmission housing are assembled together.

6. The power tool of claim 1, wherein said retainer means includes:

a set of internal ribs for engaging each of said motor housing and said transmission housing to retain said motor and said transmission assembled together inside said tool housing.

7. The power tool of claim 2, wherein:

said motor housing includes an annular bushing extending from said end wall of said motor housing and surrounding said drive shaft; and said transmission housing has an opening formed in said end wall thereof for slidably receiving said annular bushing, said annular bushing being frictionally engaged in said opening to retain said motor housing and said transmission housing assembled together.

8. The power tool of claim 7, wherein said modular transmission includes:

a retainer plate inside said transmission housing adjacent to said end wall thereof for retaining said planetary gears and said drive gear within said transmission housing.

9. The power tool of claim 7, wherein:

one or more press fit ribs are formed on said transmission housing inside of said opening for frictionally engaging said annular bushing to retain said motor housing and said transmission housing together.

10. The power tool of claim 7, wherein:

each guide pin is press fit into the corresponding guide hole, and said annular bushing and said opening provide a press fit therebetween to retain said motor and transmission housings together.

11. The power tool of claim 10, wherein:

said drive shaft is partially insertable into said aperture in said drive gear with each guide pin disengaged from the corresponding guide hole to allow said motor and transmission housings to be rotated relative to each other to align each guide pin with the corresponding guide hole.

12. The power tool of claim 11, wherein:

each guide pin is partially insertable into the corresponding guide hole with said drive shaft partially inserted into said aperture in said drive gear and with said motor bushing disengaged from said opening in said transmission housing to facilitate the assembly of the modular drive system.

13. A power tool including a modular drive system, comprising:

a tool housing for receiving the modular drive system;

a modular drive motor contained within said tool housing and including a motor housing and a rotary drive shaft, said motor housing including an annular bushing extending therefrom and surrounding said drive shaft;

a modular transmission contained within said tool housing and including a transmission housing which contains a planetary gear system having a set of planetary gears and a drive gear including an aperture for slidable insertion of said drive shaft, said transmission housing having an opening formed therein for slidably receiving said annular bushing;

a plurality of guide members formed on and extending from one of said motor and transmission housings for slidable insertion into a plurality of guide holes in the other of said motor and transmission housings when said drive shaft is inserted in said aperture in said drive gear to align said motor and transmission housings with each other, said guide members being frictionally engaged in said guide holes and said annular bushing being frictionally engaged in said opening to retain said motor and transmission together to provide the modular drive system for installation as a unit in said tool housing; and retainer means formed on said tool housing for engaging said motor and transmission housings to retain said motor and said transmission assembled together inside said tool housing.

14. The power tool of claim 13, wherein said retainer means includes:

a set of internal ribs for engaging each of said motor housing and said transmission housing to retain said motor and said transmission assembled together inside said tool housing.

15. The drive system of claim 13, wherein:

one or more press fit ribs are formed on said transmission housing inside of said opening for frictionally engaging said annular bushing to retain said motor housing and said transmission housing together.

16. The drive system of claim 13, wherein:

said guide members comprise a plurality of guide pins formed on an end wall of said transmission housing; and said guide holes are formed on an end wall of said motor housing for slidably receiving said guide pins.

17. The drive system of claim 16, wherein:

one or press fit ribs are formed on each of said guide pins for frictionally engaging said guide holes to retain said motor housing and said transmission housing together.

18. The power tool of claim 16, wherein:

said guide pins are press fit into said guide holes, and said annular bushing and said opening provide a press fit therebetween to retain said motor and transmission housings together.

19. The power tool of claim 18, wherein:

said drive shaft is partially insertable into said aperture in said drive gear with said guide pins disengaged from said guide holes to allow said motor and transmission housings to be rotated relative to each other to align said guide pins with said guide holes.

20. The power tool of claim 19, wherein:

said guide pins are partially insertable into said guide holes with said drive shaft partially inserted into said aperture in said drive gear and with said motor bushing disengaged from said opening in said transmission housing to facilitate the assembly of the modular drive system.

21. A power tool including a modular drive system, comprising:

a tool housing for receiving the modular drive system;

a modular drive motor contained within said tool housing and including a motor housing and a rotary drive shaft;

a modular transmission contained within said tool housing and including a transmission housing which contains a planetary gear system having a set of planetary gears and a drive gear including an aperture for slidable insertion of said drive shaft;

one or more guide members extending from one of said motor and transmission housings for insertion into one or more guide holes in the other of Said motor and transmission housings when said drive shaft is inserted in said aperture in said drive gear to align said motor and transmission housings with each other and to retain said motor and transmission together to provide the modular drive system for installation in said tool housing; and wherein said modular drive motor has a flux ring surrounding said motor housing and provided with a longitudinal gap therein; and said modular transmission has an alignment tab on said transmission housing which is aligned with said longitudinal gap when said drive motor and said transmission are assembled in the proper orientation for installation in said power tool housing.

22. A power tool including a modular drive system, comprising:

a tool housing for receiving the modular drive system;

a modular drive motor contained within said tool housing and including a motor housing and a rotary drive shaft;

a modular transmission contained within said tool housing and including a transmission housing which contains a planetary gear system having a set of planetary gears and a drive gear including an aperture for slidable insertion of said drive shaft;

a plurality of guide members extending from one of said motor and transmission housings for insertion into a plurality of guide holes in the other of said motor and transmission housings when said drive shaft is inserted in said aperture in said drive gear to align said motor and transmission housings with each other and to retain said motor and transmission together to provide the modular drive system for installation as a unit in said tool housing; and wherein said modular drive motor has a flux ring surrounding said motor housing and provided with a longitudinal gap therein; and said modular transmission has an alignment tab on said transmission housing which is aligned with said longitudinal gap when said drive motor and said transmission are assembled in the proper orientation for installation in said power tool housing.

* * * * *